(12) United States Patent
Miyazawa

(10) Patent No.: US 11,108,962 B2
(45) Date of Patent: Aug. 31, 2021

(54) CONTROL APPARATUS, IMAGING APPARATUS, AND CONTROL METHOD

(71) Applicant: CANON KABUSHIKI KAISHA, Tokyo (JP)

(72) Inventor: Hitoshi Miyazawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/738,318

(22) Filed: Jan. 9, 2020

(65) Prior Publication Data
US 2020/0236284 A1 Jul. 23, 2020

(30) Foreign Application Priority Data
Jan. 22, 2019 (JP) .............................. JP2019-008289

(51) Int. Cl.
*H04N 5/232* (2006.01)
(52) U.S. Cl.
CPC ..... *H04N 5/23287* (2013.01); *H04N 5/23254* (2013.01); *H04N 5/23258* (2013.01)
(58) Field of Classification Search
None
See application file for complete search history.

(56) References Cited

U.S. PATENT DOCUMENTS

| | | | |
|---|---|---|---|
| 6,332,060 B1* | 12/2001 | Miyamoto | G03B 5/00 |
| | | | 396/55 |
| 2006/0228097 A1* | 10/2006 | Higurashi | G03B 5/00 |
| | | | 396/55 |
| 2009/0285301 A1* | 11/2009 | Kurata | H04N 19/527 |
| | | | 375/240.16 |
| 2012/0093493 A1* | 4/2012 | Wakamatsu | H04N 5/23287 |
| | | | 396/55 |
| 2017/0214838 A1* | 7/2017 | Miyazawa | H04N 5/23287 |
| 2017/0214855 A1* | 7/2017 | Miyazawa | H04N 5/23287 |

FOREIGN PATENT DOCUMENTS

| | | |
|---|---|---|
| JP | 2006-317848 A | 11/2006 |
| JP | 2018-037768 A | 3/2018 |

* cited by examiner

*Primary Examiner* — James M Hannett
(74) *Attorney, Agent, or Firm* — Venable LLP

(57) ABSTRACT

A control apparatus includes a detector configured to detect a moving amount of an object image on an imaging plane based on shake information acquired from a shake detector and motion vector information acquired from an image signal, a calculator configured to calculate an object angular velocity based on the moving amount of the object image, the motion vector information, and a cycle of acquiring the object image, and a corrector configured to perform an image stabilization based on the object angular velocity.

8 Claims, 4 Drawing Sheets

CONTROL APPARATUS, IMAGING APPARATUS, AND CONTROL METHOD

BACKGROUND OF THE INVENTION

Field of the Invention

The present invention relates to a control apparatus, an imaging apparatus, and a control method.

Description of the Related Art

An imaging apparatus having a follow-shot assisting function has conventionally been known. Japanese Patent Laid-Open No. ("JP") 2006-317848 discloses a method of detecting a difference between an object velocity and a panning velocity of an imaging apparatus, and of correcting a shift amount corresponding to the difference using the image stabilization function. JP 2018-37768 discloses a method of improving accuracy of a main-object angular velocity by using, in converting a moving amount of the main object on the image plane into an angular moving velocity, a distance between a rotational center of the imaging apparatus and an imaging point on an optical axis, and a distance between an imaging plane of an image sensor and the imaging point on the optical axis, instead of a focal length.

The method disclosed in JP 2006-317848 or JP 2018-37768 can acquire the focal length in an lens interchangeable type camera system. However, this method may not acquire a distance based on the rotational center, or a first distance to the object based on a front principal point of the imaging optical system, a second distance to the imaging plane based on a rear principal point of the imaging optical system, or a third distance between the object and the imaging plane. This is because in the lens interchangeable type camera system, the imaging apparatus acquires information depending on the lens, such as the focal length, via a dedicated lens communication. Namely, when the lens attached to the imaging apparatus does not support the dedicated lens communication, the imaging apparatus may not acquire necessary information from the lens apparatus or improve the image stabilization accuracy.

SUMMARY OF THE INVENTION

The present invention provides a control apparatus, an imaging apparatus, and a control method, each of which can improve image stabilization accuracy of a main object.

A control apparatus as one aspect of the present invention includes a detector configured to detect a moving amount of an object image on an imaging plane based on shake information acquired from a shake detector and motion vector information acquired from an image signal, a calculator configured to calculate an object angular velocity based on the moving amount of the object image, the motion vector information, and a cycle of acquiring the object image, and a corrector configured to perform an image stabilization based on the object angular velocity.

An imaging apparatus having the above control apparatus and a control method corresponding to the above control apparatus also constitute another aspect of the present invention.

Further features of the present invention will become apparent from the following description of exemplary embodiments with reference to the attached drawings.

DESCRIPTION OF THE EMBODIMENTS

Referring now to the accompanying drawings, a detailed description will be given of embodiments according to the present invention.

Figure 1:
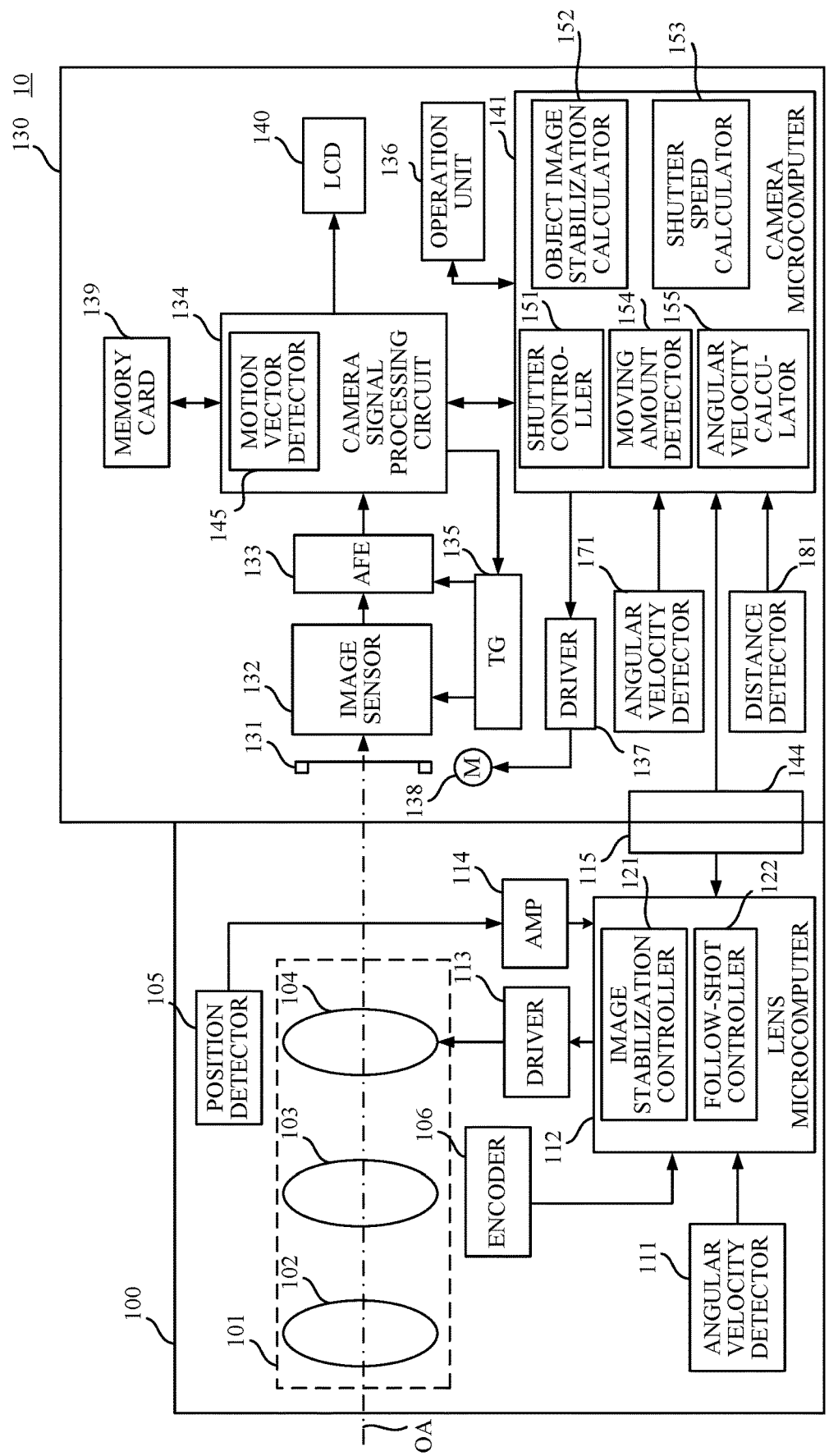
FIG. 1 is a block diagram of an imaging system according to this embodiment.

Referring now to FIG. 1, a description will be given of a configuration of a camera system (imaging system) 10 according to this embodiment. FIG. 1 is a block diagram of the camera system 10. The camera system 10 includes a camera body (imaging apparatus) 130 and the interchangeable lens (lens apparatus) 100 which is attachable to and detachable from the camera body 130. Although the camera system 10 in this embodiment includes the camera body 130 and the interchangeable lens 100 that is detachably attachable to the camera body 130, the present invention is not limited to this embodiment. The present invention is applicable to a camera system in which the camera body and the lens apparatus are integrated with each other.

The interchangeable lens 100 includes a lens unit (imaging lens) 101. The lens unit 101 includes a main imaging optical system 102, a zoom lens 103 configured to change a focal length, and a shift lens 104 configured to move in the direction perpendicular to the optical axis OA and to optically correct an image blur relative to the optical axis OA caused by a shake of the camera system 10. The interchangeable lens 100 further includes an encoder (zoom encoder) 106 that detects the position of the zoom lens (zoom lens unit) 103, and a position detector (position sensor) 105 such as a Hall element that detects the position of the shift lens (shift lens unit) 104. The interchangeable lens 100 includes an angular velocity detector (shake detector) 111 such as a gyro (angular velocity sensor) that detects the shake of the camera system 10 (interchangeable lens 100), and a microcomputer (lens microcomputer) 112 used to control the lens system. The interchangeable lens 100 also includes a driver 113 that drives the shift lens, and an amplifier circuit (AMP) 114 that amplifies an output of the position detector 105 for the shift lens 104. The interchangeable lens 100 includes a mount contact portion 115 with the camera body 130.

The lens microcomputer 112 includes an image stabilization controller 121 that performs an image stabilization control, and a follow-shot controller 122 that performs a proper image stabilization control during the follow shot. The lens microcomputer 112 also performs a focus lens control, an aperture control, and the like, but a description thereof will be omitted. While the detection and the correction are performed for two axes orthogonal to each other, such as a vertical direction and a horizontal direction for the image stabilization, the detections and the corrections for the two perpendicular axes are the same and a description for one of the axes only will be provided in this embodiment. Thus, the camera system 10 in this embodiment includes an image stabilization apparatus that performs an image stabilization by driving an optical element in a direction orthogonal to the optical axis OA (in a direction different from the optical axis OA).

The camera body 130 includes a shutter 131, an image sensor 132 such as a CMOS sensor, an analog signal processing circuit (AFE) 133, and a camera signal processing circuit 134. The camera body 130 further includes a timing generator (TG) 135 that sets operation timings of the image sensor 132 and the analog signal processing circuit 133. The camera body 130 further includes an operation unit 136 that has a power switch, a release switch, and the like. The camera body 130 includes a camera-system controlling microcomputer (referred to as a camera microcomputer hereinafter) 141 that controls the entire system of the camera body 130. The camera body 130 includes a driver 137 that drives a motor for performing a shutter operation, and a shutter driving motor 138. The camera body 130 also includes a memory card 139 that records a captured image, a liquid crystal panel (LCD) 140 that monitors and displays the captured image and the like, and a mount contact portion 144 with the interchangeable lens 100. The lens microcomputer 112 and the camera microcomputer 141 perform a serial communication at a predetermined timing via the mount contact portions 115 and 144. The interchangeable lens 100 includes an angular velocity detector (shake detector) 171 such as the gyro that detects the shake of the camera system 10 (camera body 130), and a distance detector 181.

The image sensor 132 photoelectrically converts an object image (optical image) formed through the imaging optical system in the interchangeable lens 100. The camera signal processing circuit 134 includes a motion vector detector 145 that detects the motion of the object based on the output from the image sensor 132. The camera microcomputer 141 includes a shutter controller 151, an object image stabilization calculator (corrector) 152 that calculates an object image stabilization amount, and a shutter speed calculator 153 that calculates a proper shutter speed for the follow shot. The camera microcomputer 141 includes a moving amount detector 154 and an angular velocity calculator 155. The moving amount detector 154 detects a moving amount of the object image on the imaging plane based on shake information acquired from the angular velocity detector and motion vector information acquired from the image signal. The angular velocity calculator 155 calculates the object angular velocity.

When the camera body 130 is powered on by the operation unit 136, the camera microcomputer 141 detects a status change, performs a control, and thereby provides the power supply and an initial setting for each circuit in the camera body 130. The power is supplied to the interchangeable lens 100, and the lens microcomputer 112 performs a control and performs the initial setting in the interchangeable lens 100. The communication between the lens microcomputer 112 and the camera microcomputer 141 starts at a predetermined timing. Through this communication, the communication data transmitted from the camera body 130 to the interchangeable lens 100 includes the status of the camera body 130, an imaging setting, and the like. The communication data transmitted from the interchangeable lens 100 to the camera body 130 includes focal length information of the interchangeable lens 100, angular velocity information, and the like. Each communication data is transmitted and received at necessary timings. In the interchangeable lens 100, the angular velocity detector 111 detects a shake applied to the camera system 10 due to a camera shake or the like, and the image stabilization controller 121 performs an image stabilization operation.

Figure 2:
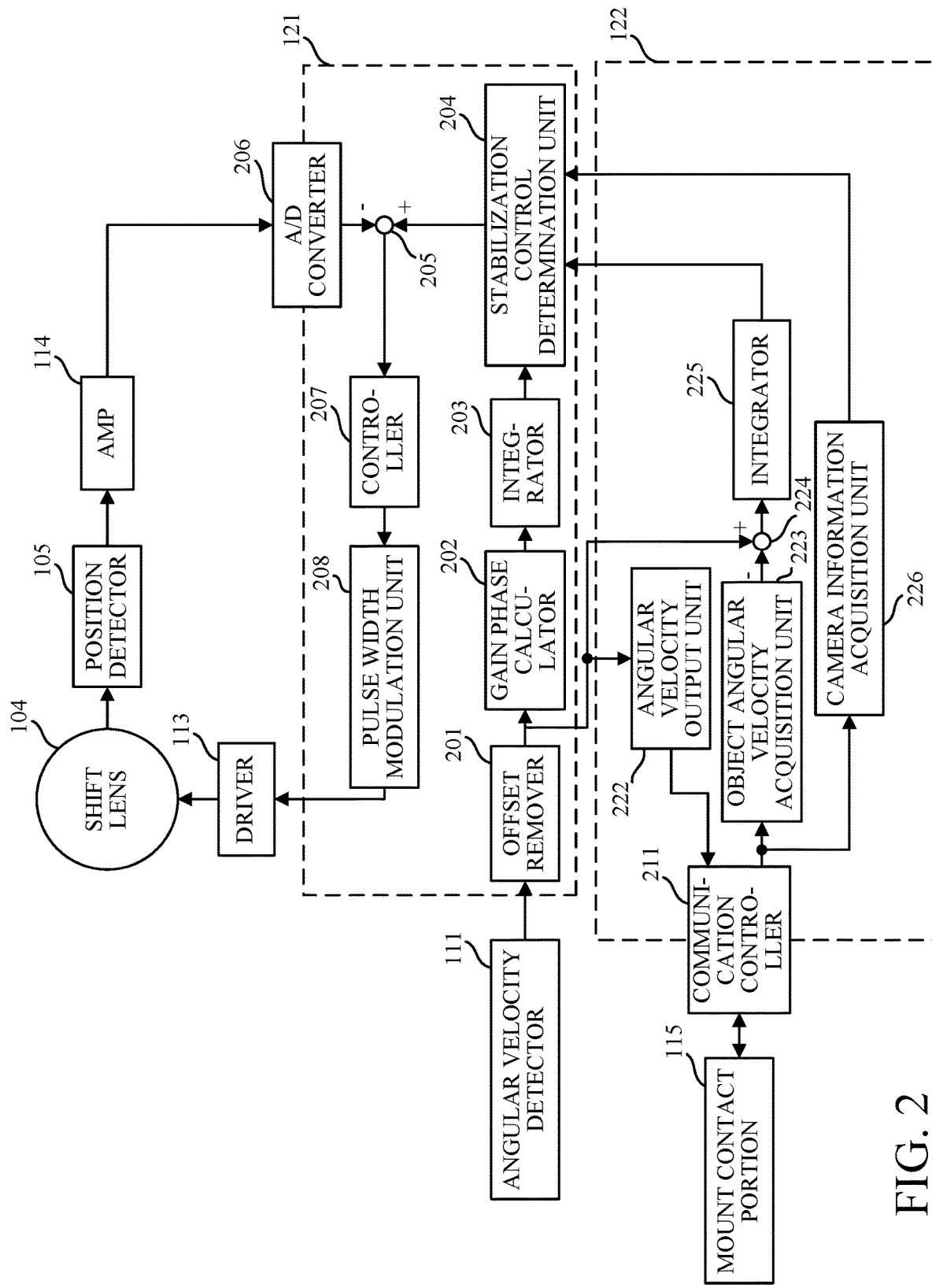
FIG. 2 is a control block diagram of an optical correction system according to this embodiment.

The image stabilization operation will be described with reference to FIG. 2. FIG. 2 is a control block diagram of an optical correction system (image stabilization apparatus) that performs the image stabilization operation. FIG. 2 omits the same components as those in FIG. 1.

The image stabilization controller 121 includes an offset remover 201, a gain phase calculator 202, an integrator 203, an image stabilization control determination unit 204, a subtractor 205, an A/D converter 206, a controller 207, and a pulse width modulation unit 208. The follow-shot controller 122 includes a communication controller 211, an angular velocity output unit 222, an object angular velocity acquisition unit 223, a subtractor 224, an integrator 225, and camera information acquisition unit 226.

The offset remover 201 is a filter calculator including a high-pass filter (HPF) or the like, and removes a DC component included in the output from the angular velocity detector 111. The gain phase calculator 202 includes an amplifier that amplifies, at predetermined gain, an angular velocity signal from which the offset remover 201 has removed the offset component, and a phase compensation filter. The integrator 203 serves to change its characteristics in arbitrary frequency bandwidth, integrates the output of the gain phase calculator 202, and calculates the driving amount of the shift lens 104. When the angular velocity of the angular velocity detector 111 is larger than certain value and a predetermined time has elapsed, it is determined that panning is in progress, and the cutoff frequency of the HPF of the offset remover 201 is gradually changed to the high frequency side. By gradually changing the cut-off frequency to the high frequency side, the target signal for the image stabilization control is gradually reduced and the optical correction system returns to the optical center position. If the optical correction system corrects the angular velocity large enough to determine that the panning is in progress without changing of the cutoff frequency to the high frequency side, the optical correction system reaches a correction limit point and the user may view unnatural changes in angle of view. This configuration solves this this problem.

The image stabilization control determination unit 204 switches a control signal for driving the shift lens 104 according to the output signal from the camera information acquisition unit 226. For example, when the user selects a follow shot mode in an imaging mode of the camera body 130, the image stabilization control determination unit 204 employs an output from the integrator 225 calculated by the follow-shot controller 122. When the user selects the imaging mode other than the follow-shot mode, the image stabilization control determination unit 204 employs an output from the integrator 203 calculated by the image stabilization controller 121. The subtractor 205 subtracts, from the output of the image stabilization control determination unit 204, data digitized at the A/D converter 206 corresponding to the value that is made by amplifying at the amplifier circuit 114 the output of the position detector 105 which detects the position of the shift lens 104. The subtractor 205 outputs deviation data to the controller 207.

The controller 207 includes the amplifier that amplifies the deviation data from the subtractor 205 at the predetermined gain, and a phase compensation filter. In the controller 207, the amplifier and the phase compensation filter perform signal processing for the deviation data the output from the subtractor 205, and subsequently the deviation data is output to the pulse width modulation unit 208. The pulse width modulation unit 208 modulates the output data from the controller 207 into a waveform that changes a duty ratio of a pulse wave (PWM waveform), and outputs the modulated data to the driver 113 for driving the shift lens 104. A driver 113 for driving the shift lens 104 is a voice coil motor configured to drive the shift lens 104. The shift lens 104 drives in a direction orthogonal to the optical axis OA depending on the output from the pulse width modulation unit 208.

Figure 5:
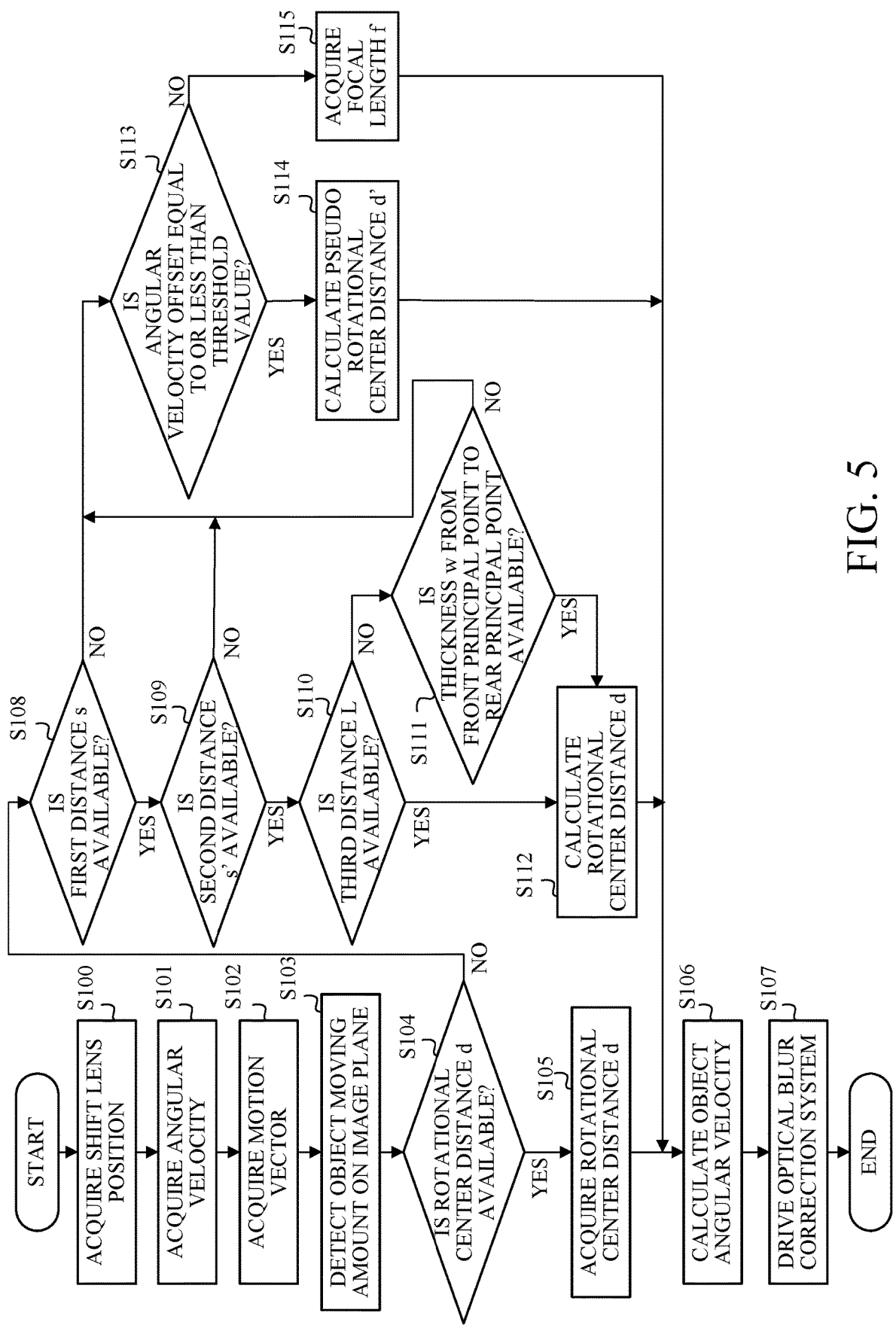
FIG. 5 is a flowchart which illustrates a control method according to this embodiment.

Referring now to FIG. 5, a description will be given of a control method (object image stabilization amount calculation method) according to this embodiment. FIG. 5 is a flowchart illustrating the control method according to this embodiment. Each step in FIG. 5 is executed based on a command mainly from the camera microcomputer 141 or the lens microcomputer 112.

Firstly, in the step S100, the lens microcomputer 112 detects the position of the shift lens 104 (referred to as a lens position hereinafter) using the position detector 105, and communicates (transmits) the lens position signal amplified by the amplifier circuit 114 from the lens microcomputer 112 to the camera microcomputer 141. In the step S101, the lens microcomputer 112 acquires the angular velocity signal output from the angular velocity detector 111, and the camera microcomputer 141 acquires the angular velocity signal output from the angular velocity detector 171. Next, in the S102, the camera microcomputer 141 detects a relative shift between the object and the camera body 130 or a motion between different frames as a vector (referred to as a motion vector hereinafter) using the motion vector detector 145. The motion vector may be detected based on a known template matching method, for example.

In the step S103, the camera microcomputer 141 uses each information acquired from the step S100 to the step S102 to divide the motion vector acquired in the step S102 (referred to as motion vector information hereinafter) into an object area vector and a background area vector. The camera microcomputer 141 selects a main object vector from the object area vectors. One method of dividing the vector into the object area vector and the background area vector is a method of calculating the moving amount on the imaging plane based on the angular velocity signal detected at the step S101, and of determining, as the background area vector, the vector corresponding to the moving amount on the imaging plane based on the angular velocity signal.

Figure 3:
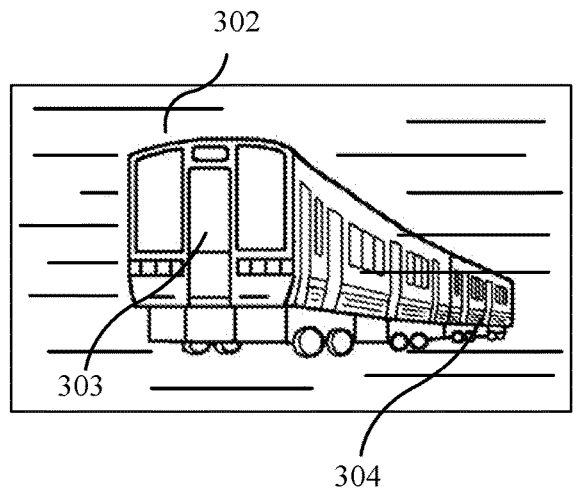
FIG. 3 explains a motion amount of the object on the image plane according to this embodiment.

The camera microcomputer 141 selects the main object vector from the divided object area vectors. Referring to FIG. 3, a description will be given of a method of selecting a main object vector. FIG. 3 explains the motion amount of the object on the image plane. As described in FIG. 3, the vectors detected at a front part 303 of the object 302 and a rear part 304 of the object 302 are different. If the camera system 10 and the object are moved together at the same speed while the direction of the camera system 10 is maintained (or the camera system 10 does not rotate), the front part 303 of the object 302 and the rear part 304 of the object 302 have the same vectors. However, in the actual movement of the camera system 10, the camera system 10 does not pan in the parallel direction, but the camera system 10 pans at a certain angle. Thus, when viewed from the camera system 10, the front part 303 and the rear part 304 of the object 302 have different vectors. The influence becomes more significant as the focal length is close to the wider angle side and an imaging distance becomes shorter. In contrast, the infinitely long imaging distance is equivalent to imaging with running parallel to the object, and thus the entire object is likely to stop. The user finally selects the vector of the object part to be stopped as the main object vector. The method for selecting the main object vector is, for example, to select a vector of the object area closest to the most accurately in-focused frame position among the focus frames. This embodiment uses a distance from the position based on the rotational center to the imaging point on the optical axis of the image sensor 132 (referred to as a rotational center distance hereinafter), instead of the focal length used to convert the object vector into the object angular velocity.

Figure 4:
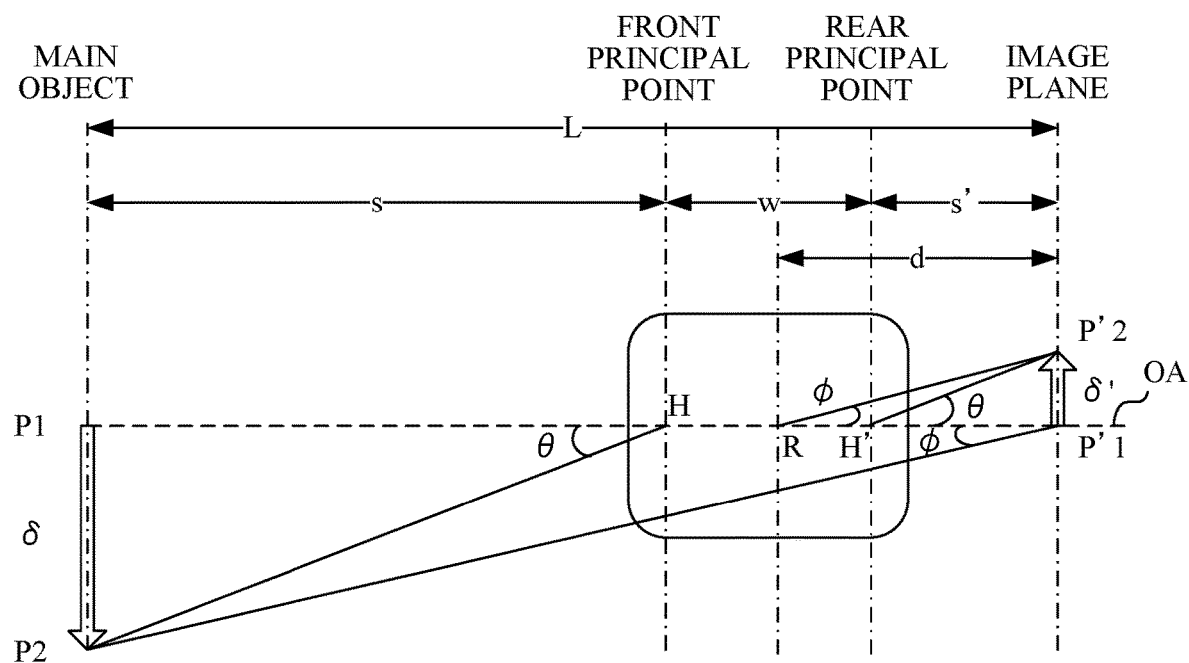
FIG. 4 explains a rotational center distance according to this embodiment.

Referring now to FIG. 4, the rotational center distance will be described. FIG. 4 explains the rotational center distance, and schematically illustrates a distance (rotational center distance d) when the rotational center position is located at the position P'1 of the image plane (imaging plane) on the optical axis. FIG. 4 illustrates the movement of the main object and the movement of the main object image formed on the imaging plane by light from the main object through the lens unit.

It is assumed that the main object before the movement is located at a position P1 on the optical axis, and the main object moves to a position P2 that is separated by a distance (moving amount) δ in a direction orthogonal to the optical axis OA. The main object image before the movement on the image plane is located at a position P'1 on the optical axis, and the main object image after the movement, moves to a position P'2 that is separated by a distance (moving amount) δ' in a direction orthogonal to the optical axis OA. Then, the moving amount δ of the main object is expressed by the following expression (1) using the object distance s between the front principal point position H and the position P1 (first distance to the object based on the front principal point position H), and a moving angle θ of the main object.

$$\delta = s \times \tan \theta \qquad (1)$$

Now assume that s' is an image distance between the rear principal point position H' and the position P'1 on the optical axis on the imaging plane (second distance to the imaging plane based on the rear principal point position H'). Then, the moving amount δ' of the main object on the imaging plane is expressed by the following expression (2) because a triangle HP1P2 and a triangle H'P'1P'2 are similar to each other.

$$\delta' = s' \times \tan \theta \qquad (2)$$

Assume that φ is a rotational angle of the camera system 10, and L is an imaging distance as a third distance from the imaging plane to the main object after the movement on the optical axis. Then, the following expression (3) is established for the triangle P1P2P'1.

$$\delta = L \times \tan \emptyset \qquad (3)$$

A straight line is drawn from the position P'2 of the main object on the imaging plane at an angle φ relative to the optical axis OA and a distance (rotational center distance) is defined between a point R corresponding to the rotational center where the straight line intersects the optical axis OA and the imaging plane. In other words, the distance (rotational center distance d) is a distance on the optical axis from the imaging plane where a moving amount corresponding to an angle that coincides with the rotational angle of the camera body 130 is equal to a moving angle calculated from the movement of the main object between the continuously captured images. A triangle RP'1P'2 formed by the point R corresponding to the rotational center position P'1 and the positions P'1 and P'2 of the main object on the imaging plane before and after the movement, and a triangle P'1P1P2 formed by the rotational center position P'1 and the positions P1 and P2 of the object in real space before and after the movement are similar to each other. A straight line is drawn from the position P'2 of the main object on the imaging plane corresponding to the position P2 of the main object after the movement, so as to form an angle of φ relative to the optical axis OA which is an angle between the optical axis OA and a line connecting the position P2 of the object after the movement when viewed from the rotational center position P'1. Then, the distance d is a distance on the optical axis between the point R at which the straight line intersects the optical axis OA and the imaging plane. The moving amount δ' of the object on the imaging plane is expressed by the following expression (4) using the distance d and the angle φ.

$$\delta' = d \times \tan \theta \quad (4)$$

The expressions (1) to (4) are rearranged, and the following expression (5) is acquired for the distance d.

$$d = \frac{s'}{s} \times L \quad (5)$$

The imaging distance L can be expressed using the first distance s, the second distance s', and a lens thickness w from the front principal point position H to the rear principal point position H'. Thus, the distance d is expressed by the following expression (6) without the imaging distance L.

$$d = \frac{s'}{s} \times (s + w + s') \quad (6)$$

In the interchangeable lens type camera system 10, the lens microcomputer 112 may communicate the rotational center distance to the camera microcomputer 141 in some cases and may not in other cases. Thus, the camera microcomputer performs the control while switching between using the rotational center distance or the focal length depending on communication status. In the step S104 in FIG. 5, the camera microcomputer 141 determines whether the rotational center distance d is available. When the rotational center distance d is available, it proceeds to the step S105. In the step S105, the camera microcomputer 141 acquires the rotational center distance d. Next, in the step S106, the camera microcomputer 141 calculates the main object angular velocity based on the following expression (7) using the rotational center distance d and the main object vector.

$$\omega = \rho \times \tan^{-1}\left(\frac{v}{d}\right) \quad (7)$$

In the expression (7), ω is the main object angular velocity, ρ is a cycle of acquisition of the object image (frame rate), v is the main object vector, and d is the rotational center distance.

Next, in the step S107, the camera microcomputer 141 transmits the main object angular velocity calculated in the step S106 to the lens microcomputer 112. The camera microcomputer 141 (lens microcomputer 112) uses the shift lens 104 to correct the blur in the main object (image blur) based on difference between the main object angular velocity calculated in the step S106 and the output signal from the angular velocity detector 111. This configuration can acquire an image in which the main object is stationary with reduced or no object blurs. In this embodiment, the image stabilization unit includes the shift lens 104 in the interchangeable lens 100, but the image stabilization may be made with a circuit that drives the image sensor 132 in the camera body 130 as the image stabilization mechanism instead.

In contrast, if the camera microcomputer 141 cannot acquire the rotational center distance d in the step S104, it proceeds to the step S108. In the step S108, the camera microcomputer 141 determines whether the first distance s to the object based on the front principal point position of the imaging optical system is available. If the first distance s is available, the camera microcomputer 141 proceeds to the step S109. If the first distance s is unavailable, the camera microcomputer 141 proceeds to the step S113.

In the step S109, the camera microcomputer 141 determines whether the second distance s' to the imaging plane based on the rear principal point position of the imaging optical system is available. If the second distance s' is available, the camera microcomputer 141 proceeds to the step S110. If the second distance s' is unavailable, the camera microcomputer 141 proceeds to the step S113.

In the step S110, the camera microcomputer 141 determines whether the third distance L between the object (main object) and the imaging plane is available. If the third distance L is available, the camera microcomputer 141 proceeds to the step S112. If the third distance L is unavailable, the camera microcomputer 141 proceeds to the step S111.

In the step S111, the camera microcomputer 141 determines whether the lens thickness w from the front principal point position H to the rear principal point position H' is available. If the lens thickness w is available, the camera microcomputer 141 proceeds to the step S112. If the third distance L is unavailable, the camera microcomputer 141 proceeds to the step S113.

In the step S112, the camera microcomputer 141 calculates the rotational center distance d. That is, when the camera microcomputer 141 can acquire the first distance s, the second distance s', and the third distance L or the lens thickness w, the camera microcomputer 141 calculates the rotational center distance d based on the expression (5) or (6).

If the first distance s, the second distance s', or the third distance L or the lens thickness w is unavailable in the steps S108 to S111, the camera microcomputer 141 calculates a pseudo rotational center distance d' by multiplying the focal length by a predetermined gain. The rotational center distance d' is calculated using the moving amount $v_G$ on the imaging plane that is acquired by converting the angular velocity $\omega_G$ acquired in the step S101, based on the following expression (8).

$$v_G = f \times \tan\left(\frac{\omega_G}{\rho}\right) \quad (8)$$

In the expression (8), $\omega_G$ is the angular velocity, ρ is the cycle of acquiring the object image (frame rate), $v_G$ is the moving amount of $\omega_G$ on the imaging plane, and f is the focal length. The motion vector is acquired in the step S102 based on the image signal output from the image sensor 132. Hence, when the rotational center is based on the image sensor, the difference between the motion vector (background area vector $v_B$) and the moving amount $v_G$ on the imaging plane based on the angular velocity $\omega_G$ is available as the pseudo rotational center distance d'. However, the shake detector that detects the angular velocity $\omega_G$ in the expression (8) is generally a gyro sensor, and the output of the gyro sensor generally varies due to the influence of a temperature drift, disturbance, or the like. In other words, when the motion vector is simply compared with the moving amount VG on the imaging plane based on expression (8), an error factor other than the difference in the distance to the original rotational center may be included.

Accordingly, in the step S113, the camera microcomputer 141 determines whether an angular velocity offset (referred to as an offset component hereinafter) is equal to or less than a threshold value. The offset component is output using a well-known technique where the camera microcomputer 141 numerically simulates the gyro sensor using a Kalman filter, and outputs the offset component of the gyro sensor through the Kalman filter using the angular velocity of the gyro sensor, the lens position of the shift lens, and the vector information as inputs. The camera microcomputer 141 determines whether the offset component is equal to or less than the threshold value (for example, ±0.005 [deg/sec]) in the cycle of acquiring the object image (frame rate). If the offset is larger than the threshold value, the camera microcomputer 141 proceeds to the step S115. In the step S115, the camera microcomputer 141 acquires the focal length f and proceeds to the step S106.

On the other hand, if the offset of the gyro sensor is equal to or smaller than the threshold value in the step S113, the camera microcomputer 141 proceeds to the step S114. In the step S114, the camera microcomputer 141 calculates the pseudo rotational center distance d' by multiplying, by the focal length f, the difference between the background area vector VB acquired in the step S103 and the moving amount $v_G$ on the imaging plane based on the expression (8) as described in the following expression (9).

$$d' = |v_B - v_G| \times f \quad (9)$$

In the step S106, the camera microcomputer 141 calculates the main object angular velocity ω applying the pseudo rotational center distance d' based on the expression (9) instead of d in the expression (7) as described in the following expression (10)

$$\omega = \rho \times \tan^{-1}\left(\frac{v}{d'}\right) \quad (10)$$

If the offset component of the gyro sensor is larger than or equal to the threshold value in the step S113, the camera microcomputer 141 calculates the main object angular velocity ω based on the following expression (11) using the focal length f acquired in the step S115.

$$\omega = p \times \tan^{-1}\left(\frac{v}{f}\right) \quad (11)$$

This embodiment uses the rotational center distance d or the pseudo rotational center distance d' instead of the focal length, and can improve the calculation accuracy of the main object angular velocity ω and thereby the object image stabilization accuracy of the main object.

Thus, in this embodiment, the control apparatus (camera microcomputer 141) includes the detector (moving amount detector 154), the calculator (angular velocity calculator 155), and the corrector (object image stabilization calculator 152). The detector detects the moving amount (v) of the object image on the imaging plane based on the shake information ($\omega_G$) acquired from the shake detector (angular velocity detectors 111 and 171) and the motion vector information acquired from the image signal (image data output from the image sensor 132). The calculator calculates the object angular velocity (ω) based on the moving amount (v) of the object image, the motion vector information ($v_B$), and the cycle of acquiring the object image (ρ). The corrector performs an image stabilization based on the object angular velocity.

The calculator may calculate the object angular velocity using the value acquired by multiplying the focal length (f) by the gain based on the motion vector information (pseudo rotational center distance d'). The calculator may calculate the gain based on the background area vector information ($v_B$) among the motion vector information and the moving amount ($v_G$) on the imaging plane based on the shake information (step S114: expression (9)). When the offset component of the shake detector is smaller than the predetermined threshold, the calculator may calculate the object angular velocity using the value acquired by multiplying the focal length by the gain (d') (steps S113 and S114: expression) (10)). When the offset component of the shake detector is larger than the predetermined threshold, the calculator may calculate the object angular velocity using the focal length without using the gain (steps S113 and S115: expression (11)).

The calculator may change the calculation method for the object angular velocity according to the imaging status. When the imaging status is the first status, the calculator may calculate the object angular velocity based on the information acquired from the lens apparatus (interchangeable lens 100). When the imaging status is the second status, the calculator may calculate the object angular velocity based on the moving amount of the object image, the motion vector information and the cycle of acquiring the object image. The first status is a situation in which, for example, the information on the rotational center distance d (the rotational center distance d or information necessary to calculate the rotational center distance d) is available from the lens apparatus. The second status is a situation in which, for example, the information on the rotational center distance d is not available from the lens apparatus. When the imaging status is the first status, the calculator may detect the object angular velocity based on the motion vector information, the cycle of acquiring the object image, the first distance (s), the second distance (s'), and the third distance (L). The first distance is the distance to the object based on the front principal point of the imaging optical system in the lens apparatus, the second distance is the distance to the imaging plane based on the rear principal point of the imaging optical system, and the third distance is the distance between the object and the imaging plane.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory apparatus, a memory card, and the like.

Each embodiment provides a control apparatus, an imaging apparatus and a control method that can improve the image stabilization accuracy of the main object.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-008289, filed on Jan. 22, 2019 which is hereby incorporated by reference herein in its entirety.

What is claimed is:

1. A control apparatus comprising:
a detector configured to detect a moving amount of an object image on an imaging plane based on (a) shake information acquired from a shake detector and (b) motion vector information acquired from an image signal;
a calculator configured to calculate an object angular velocity based on (a) the moving amount of the object image, (b) the motion vector information, and (c) a cycle of acquiring the object image; and
a corrector configured to perform an image stabilization based on the object angular velocity,
wherein the calculator calculates a gain based on (a) vector information in a background area among the motion vector information and (b) a moving amount on the imaging plane based on the shake information, and
wherein the calculator calculates the object angular velocity using a value acquired by multiplying a focal length by the gain.

2. The control apparatus according to claim 1, wherein when an offset component of the shake detector is smaller than a predetermined threshold, the calculator calculates the object angular velocity using the value acquired by multiplying the focal length by the gain.

3. The control apparatus according to claim 1, wherein when the offset component of the shake detector is larger than the predetermined threshold, the calculator calculates the object angular velocity using the focal length without using the gain.

4. The control apparatus according to claim 1, wherein the calculator changes a calculation method of the object angular velocity according to an imaging status.

5. The control apparatus according to claim 4, wherein when the imaging status is a first status, the calculator calculates the object angular velocity based on information acquired from a lens apparatus, and
wherein when the imaging status is a second status, the calculator calculates the object angular velocity based on (a) the moving amount of the object image, (b) the motion vector information, and (c) the cycle of acquiring the object image.

6. The control apparatus according to claim 5, wherein when the imaging status is the first status, the calculator calculates the object angular velocity based on (a) the motion vector information, (b) the cycle of acquiring the object image, (c) a first distance to the object based on a front principal point of an imaging optical system in the lens apparatus, (d) a second distance to an imaging plane based on a rear principal point of the imaging optical system, and (e) a third distance between the object and the imaging plane.

7. An imaging apparatus comprising:
an image sensor configured to perform a photoelectric conversion for an object image;
a detector configured to detect a moving amount of an object image on an imaging plane based on (a) shake information acquired from a shake detector and (b) motion vector information acquired from an image signal;
a calculator configured to calculate an object angular velocity based on (a) the moving amount of the object image, (b) the motion vector information, and (c) a cycle of acquiring the object image; and
a corrector configured to perform an image stabilization based on the object angular velocity,
wherein the calculator calculates a gain based on (a) vector information in a background area among the motion vector information and (b) a moving amount on the imaging plane based on the shake information, and
wherein the calculator calculates the object angular velocity using a value acquired by multiplying a focal length by the gain.

8. A control method comprising the steps of:
detecting a moving amount of an object image on an imaging plane based on (a) shake information acquired from a shake detector and (b) motion vector information acquired from an image signal;
calculating an object angular velocity based on (a) the moving amount of the object image, (b) the motion vector information, and (c) a cycle of acquiring the object image; and
correcting an object blur based on the object angular velocity,
wherein the calculating comprises (1) calculating a gain based on (a) vector information in a background area among the motion vector information and (b) a moving amount on the imaging plane based on the shake information and (2) calculating the object angular velocity using a value acquired by multiplying a focal length by the gain.

* * * * *